United States Patent [19]
Perkins et al.

[11] Patent Number: 4,802,048
[45] Date of Patent: Jan. 31, 1989

[54] LIMITED PLAY TAPE CASSETTE SYSTEM

[75] Inventors: Leland M. Perkins; Ralph L. Dodds, both of Thousand Oaks; David H. Rubenstein, Westlake; Roger D. Nicholson, Irvine, all of Calif.

[73] Assignees: David H. Rubenstein; Rodger D. Nicholson, both of Santa Ana, Calif.

[21] Appl. No.: 926,368

[22] Filed: Oct. 31, 1986

[51] Int. Cl.4 .......................... G11B 15/32; G11B 23/04
[52] U.S. Cl. ..................................... 360/132; 242/198; 242/199
[58] Field of Search ................. 360/66, 118, 132, 137; 242/197–200; 206/387

[56] References Cited

U.S. PATENT DOCUMENTS

| | | | |
|---|---|---|---|
| 3,630,170 | 12/1971 | Christo | 116/114 |
| 3,995,319 | 11/1976 | Harris | 360/137 |
| 4,466,584 | 8/1984 | Chevalier et al. | 242/199 |
| 4,475,222 | 10/1984 | Egendorf | 377/15 |
| 4,482,104 | 11/1984 | Saito | 242/198 |
| 4,512,535 | 4/1985 | Dickson et al. | 242/200 |
| 4,575,778 | 3/1986 | Vogelgesang | 360/132 |
| 4,586,101 | 4/1986 | Vogelgesang | 360/132 |
| 4,660,116 | 4/1987 | Westfall et al. | 360/132 |
| 4,702,434 | 10/1987 | Brauer | 242/198 |

Primary Examiner—Stuart N. Hecker
Assistant Examiner—Benjamin E. Urcia
Attorney, Agent, or Firm—Freilich, Hornbaker Rosen & Fernandez

[57] ABSTRACT

An assembly added to a conventional VHS cassette provides a wheel for counting the number of plays, or replays of segments of more than a predetermined length, and preventing further replay after the last authorized play by either releasing a spring biased arm to carry an erase head against the tape, or locking the cassette brakes in the engaged position once the cassette is removed form the tape deck.

9 Claims, 6 Drawing Sheets

LIMITED PLAY TAPE CASSETTE SYSTEM

BACKGROUND OF THE INVENTION

This invention relates to a system for limiting the plays of tape cassettes, such as video cassettes, and more particularly to a system for counting the number of times the tape is played, or partially played, and to stop any further playing after a predetermined number of plays.

Mechanisms have been proposed for counting the number of times a video cassette has been used or played, and displaying the count for the purpose of computing a rental charge. See U.S. Pat. Nos. 3,995,319, 4,475,222, 4,575,778 and 4,586,101. A mechanism has also been proposed in U.S. Pat. No. 4,466,584, which will limit the total number of plays. The system in that patent uses an escapement to count the number of plays. A tape feeler assembly provides the escapement with the necessary cyclic motion as the tape is played and rewound. Once a predetermined number of plays have been counted, the mechanism locks to prevent further playing by providing a wheel locked to the escapement with an abutment.

A major disadvantage of that escapement system is inherent in the nature of an escapement; the mass of the base to which tape feelers are connected may be caused to oscillate, and thus advance the count wheel, if the cassette is jarred. It is for that reason that escapements are generally used only in systems that are handled with care, such as a clock, or that are so installed as to not be subject to being jarred. Another disadvantage is that locking the escapement, or a wheel connected to it, will not prevent further play; it will simply increase the drag on the reels. Such drag, if sufficient to prevent normal speed of the tape, may cause damage to the playback mechanism.

Advantages of an arrangement for counting and limiting the maximum number of times a video cassette may be played are that the rental charge of a video cassette may be based upon the number of times it is played, and the distributor of the rental video cassette may limit the number of times it is played to protect the proprietor of copyrighted material recorded on the tape. However, such an arrangement has many problems to be considered. If the mechanism is set to advance the count only at either extreme of play and rewind, the intent of the mechanism is easily defeated by avoiding the beginning and end during successive replays. To set it to advance at some intermediate point is not the solution either, for that prevents the viewer from enjoying a legitimate replay of a scene spanning that point.

Another problem is concerned with how easily the system may be defeated, such as by inserting a probe into the cassette to release the lock mechanism, or resetting the counter, after which the cassette will replay at least one other time, or replay the entire predetermined number of the authorized times.

OBJECTS AND SUMMARY OF THE INVENTION

A major objective of this invention is to provide a means of counting whole and partial play-rewind cycles of a video cassette (or similar magnetic tape or optical film cartridge). Such a mechanism will allow limited viewing of copyrighted material contained in any selected portion of the tape. This overcomes the limitations of the prior art which is nonselective in registering counts for partial use, and cannot register for repeated plays of small segments between the ends of the tape. Preview and trailer information could still be viewed repeatedly without penalty by adjusting a span of uncounted play-rewind cycles at the beginning and end of the tape to encompass the length of previews and trailers recorded.

Another major objective is to limit the number of times the cassette may be played, by erasing the tape or by securing locks of the reels after the last authorized play. Optical warning of last use and/or locked condition may be incorporated in the design.

In accordance with the present invention, a reel follower arm between the tape reels of a cassette pivots back and forth through an angle greater than or equal to a small defined angle as the cassette tape is played and rewound. During the play mode, a clutch (friction or detent) couples the motion of the follower arm to a count wheel comprised of a ratchet wheel and pawl. The counting action starts as the count wheel begins to rotate. When it has rotated sufficiently for the count to have been advanced by one, a clutch stop prevents further rotation of the clutch and count wheel, the ratchet pawl engages the next tooth of the ratchet wheel, and the clutch allows the drive motion between the follower arm and count wheel to slip. On rewind, the motion of the follower arm is again engaged by the clutch but the ratchet pawl prevents the ratchet wheel from rotating in reverse.

Hysteresis inherent in the follower arm manifests itself upon changing direction of rotation, and will permit a predetermined amount of rewind without arming the counter for uncounted replays of small segments anywhere along the length of the tape. The minimum length of an uncounted segment replay is controlled in part by the gap between the follower arm and the tape being wound on a reel when the direction of the tape is reversed. The greater the gap, the greater the hysteresis, and therefore the longer the segment that may be replayed without penalty. If a detent clutch is used, the clutch coupling will slip until the next detent notch is reached. By programming the spacing of the notches, it is possible to pre-define particular segments within which replay is permitted without penalty.

In the case of a detent clutch, a reciprocating arm coupled to the reel follower arm by the detent clutch carries a driving pawl which advances the ratchet wheel by one tooth for each play motion of the reel follower arm through an angle equal to or greater than the angle defined by the clutch stops. The detent then rides over notches until the end of the tape. When the tape is rewound, the detent engages the first notch encountered and the follower arm drives the reciprocating arm to drag the driving pawl over one tooth of the ratchet wheel for the next count. Clutch stops again prevent the ratchet arm from rotating further, and the detent rides over notches until rewind is stopped and play is again started. The first notch encountered by the detent will then cause the reciprocating arm to rotate and advance the count. If the rewind is not sufficient for the detent to engage another notch, and thus drag the driving pawl over the next tooth, the count will not be advanced when play is resumed. In that manner, the last segment played, or any portion of it, may be replayed without penalty. However, since the segments are predetermined by the spacing between notches, the detent clutch embodiment of the invention is better suited to cassettes on which programs have been recorded that consist of defined segments corresponding to the spacing of the detent notches.

A spring loaded magnet is released from the tape follower arm when the last authorized play is started so that, as the tape is played, it is erased. This severely restricts replay of a segment during the last authorized play to just so much of the tape as is between the playback head in the tape deck and the erase magnet. That length of tape will take care of normal stop and restart actions, during which there is some rewind, and also permit a short scene to be viewed again. During the last play, the ability to replay programmed time segments would be lost.

A reel lock or magnet release mechanism is triggered by the ratchet pawl dropping into a notch on the ratchet wheel after the tooth of the last permitted replay count in the case of locking up the reels, or in the position of the last permitted replay count in the case of erasing during that last play. The motion of the ratchet pawl dropping into the notch is sufficient to lock the reel brakes in the engaged position, once the cassette is removed from the tape deck, or to pull a pin holding the spring loaded magnet in the follower arm. Once the magnet is released, tape passing over it on play or rewind will be erased.

Other objects and advantages of the invention will become readily apparent to those skilled in the art from the following description and the accompanying drawings.

DESCRIPTION OF PREFERRED EMBODIMENTS

Figure 1:
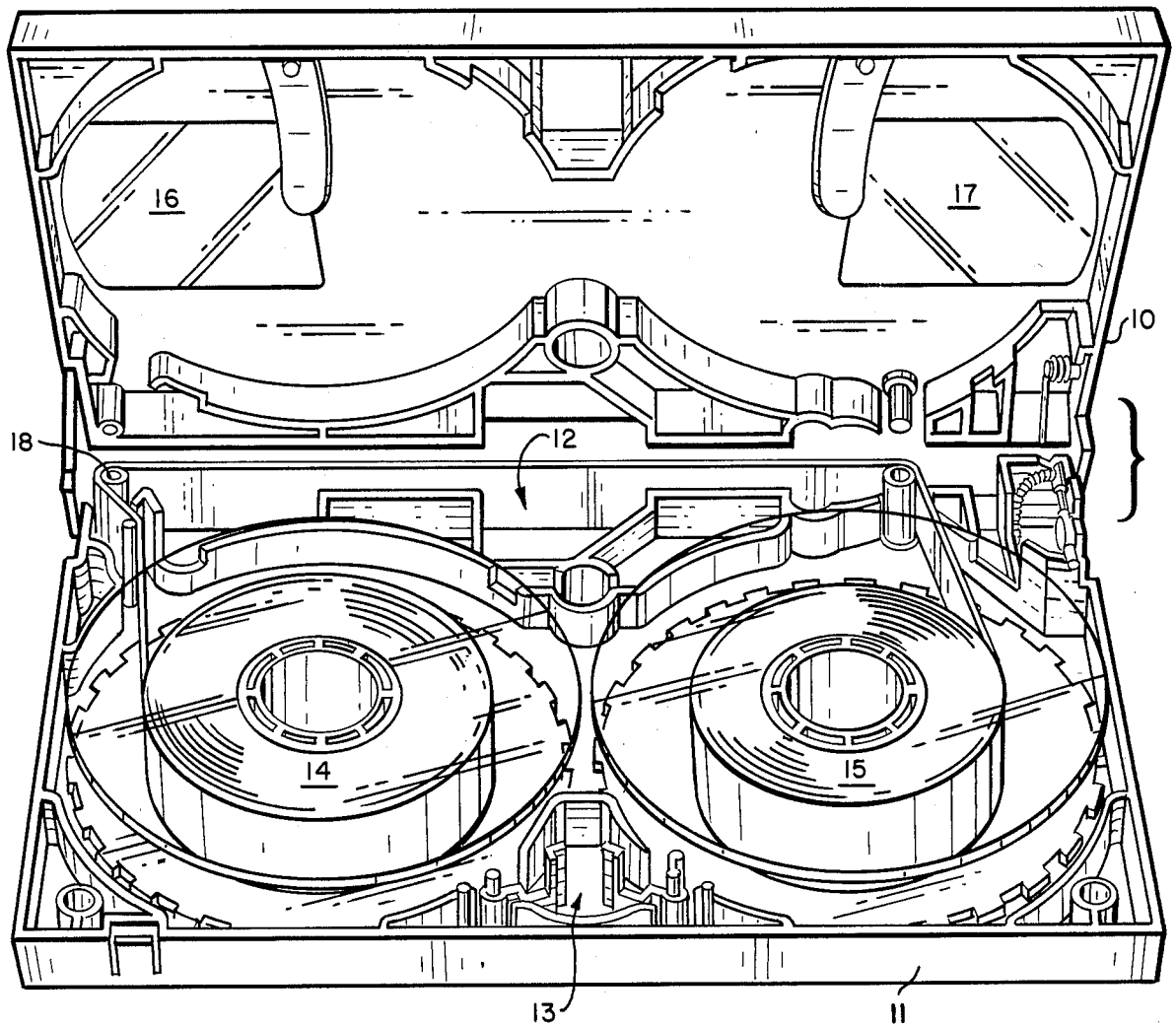
FIG. 1 illustrates a conventional VHS video cassette that has been opened to show the general organization of the cassette.
Figure 2:
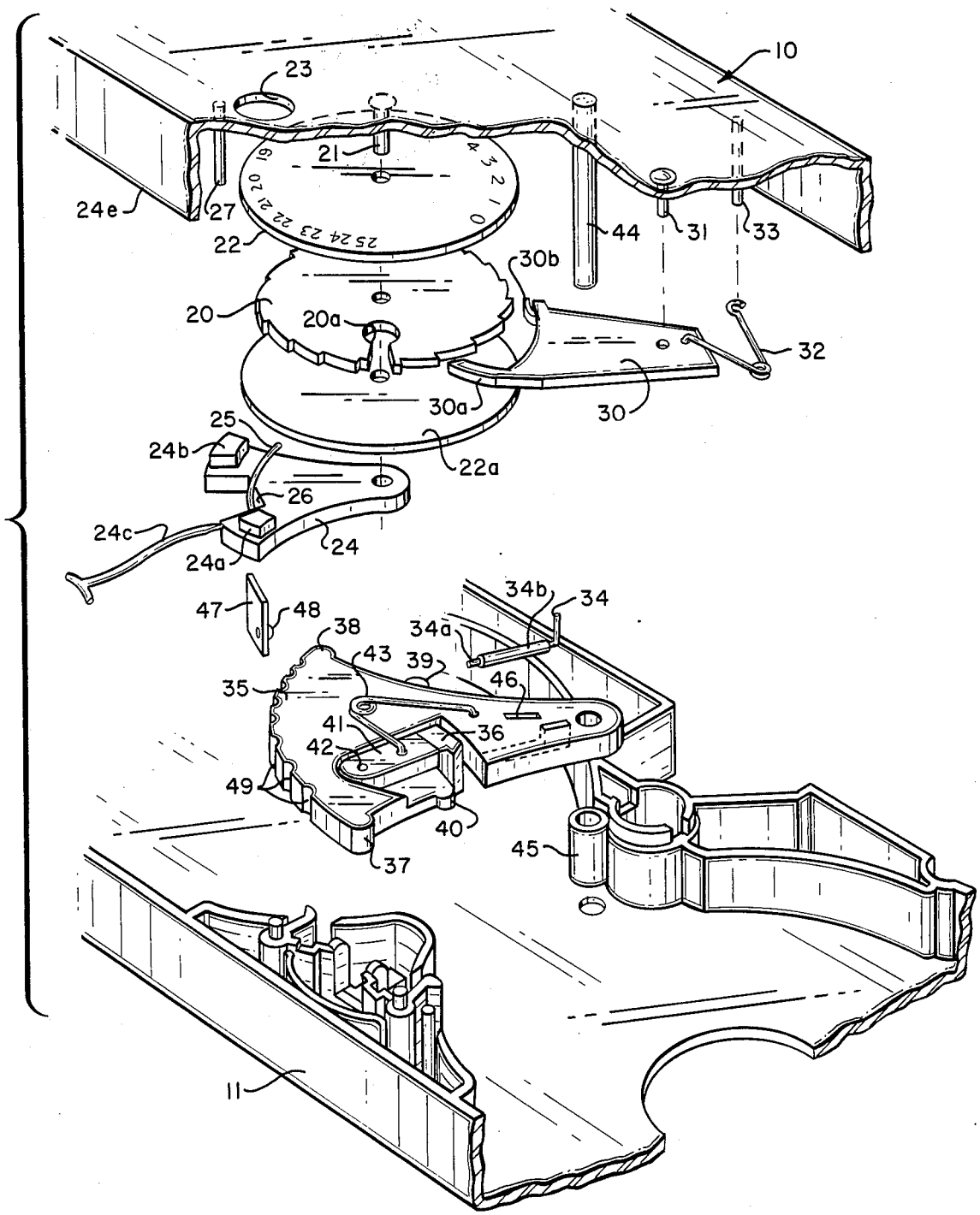
FIG. 2 is an exploded view of a first embodiment of the present invention using a detent clutch for counting and limiting the number of times a conventional VHS video cassette may be played, and erasing the tape after the last count.

Referring to the drawings, FIG. 1 illustrates the top and bottom halves 10 and 11 of a conventional VHS video cassette from which it may be seen that there is space in the top half 10 over tape guide walls in an area 12, once tape guide walls in the top half are removed as necessary to mount a ratchet counter as shown in FIG. 2. The ratchet counter is comprised of a ratchet wheel 20 pivoted on a pin 21 extending through the cassette wall of the top half of the exploded view in FIG. 2.

Referring again to FIG. 1, the cassette holds a supply reel 14 and a takeup reel 15 shown in FIG. 1. A window 16 in the top half permits viewing the amount of tape on the supply reel, and a window 17 permits viewing the amount of tape on the takeup reel. The tape feeds out past a post 18 from the supply side, and past a post 19 into the takeup side during play. The roles of the reels are, of course, reversed during rewind.

Referring now to FIG. 2, the ratchet wheel 20 carries a count disc 22 with numbers as shown. These numbers are visible through a small window 23 in the top half 10 of the cassette housing. This window, shown open, is intended to be closed, preferably by a magnifying lens. A Y-shaped reciprocating lever 24 is also pivoted on the pin 21. Mounted on one branch of the reciprocating lever 24 by a block 24a is a wire pawl 25 which communicates rotary motion to the ratchet wheel 20. A block 24b is also provided on the second branch. Together blocks 24a and 24b assure that the reciprocating lever 24 is spaced away from the upper half of the cassette housing so as not to jam against the ratchet wheel 20.

As the reciprocating lever 24 rotates counterclockwise (as viewed in FIG. 2), the pawl 25 rides over the teeth of the ratchet wheel. It should be noted that the count disc 22 is slightly larger than the sprocket wheel 20. Another thin disc 22a of the same diameter as the count disc 22 cooperates with the count disc to provide a channel between the discs that holds the pawl 25 over the teeth of the ratchet wheel.

As will be described more fully hereinafter, the pawl 25 rides over one tooth of the sprocket wheel during rewind. Mounted on the top half of the cassette is a stop pin 27. This pin is positioned between the branches of the reciprocating lever 24 to limit the angle through which it pivots. Once the lever 24 has been pivoted sufficiently for the ratchet 25 to advance over just one tooth of the ratchet wheel 20, the pin 27 stops the lever from pivoting further. Upon playing the tape, the reciprocating lever is pivoted clockwise (as viewed in FIG. 2). The pawl 25 then pushes on the tooth it has just passed over to advance the ratchet wheel by one count which places the next number on the disc 22 under the window 23. Thus, the ratchet wheel advances the count only during the initial part of a play, and it advances the count by only one during each play, although, as will be seen later, replay of limited segments of the tape are permitted without penalty, i.e., without advancing the count by one for each replay.

Figure 5:
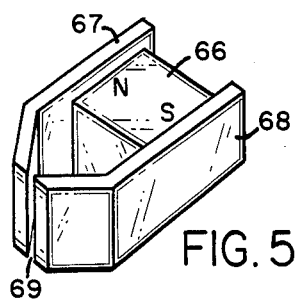
FIG. 5 illustrates a preferred design for an erase head to be used in the embodiments of FIGS. 2 and 3.

Riding over the ratchet teeth is a pawl 30 pivoted on a pin 31. The pawl is shaped with a finger 30a which just fits a slot 20a cut in the ratchet wheel 20. A wishbone spring 32 anchored on a pin 33 is so connected to the ratchet pawl 30 as to bias it against the ratchet wheel. Once the ratchet wheel has advanced the count disc to the number of the last authorized play, the pawl finger 30a will move into the slot 20a in the ratchet wheel. The spring 32 is provided with a "near center" loading so that the spring force is a minimum until the end secured to the pawl 30 begins to move. The spring force increases as the finger 30a moves into the slot 20a for positive latching. While the pawl 30 is thus rotating clockwise (as viewed in FIG. 2), a latch release paddle 30b carried on the underside of the leading edge of the pawl 30 will engage an L-shaped latch pin 34 in a tape follower arm 35 to release a spring loaded permanent magnet 36 carried by the tape follower. The permanent magnet is held between pole pieces, as shown in FIG. 5, to form an erase head. When the gap of the erase head is against the tape during the last authorized play, it erases the tape as it passes through the tape deck onto the takeup reel. Since the magnet 36 may be released during a replay of a segment within a normal play, it is possible that only the last part of the tape will be erased as it is wound on the takeup reel. However, when the tape is rewound on the supply reel in order to play it again, the entire tape passes over the erase head, and is erased.

As noted above, when the tape is transferred from the supply reel on the left to the takeup reel on the right, the follower arm 35 rotates clockwise (as viewed in FIG. 2), and vice versa. Thus, power that drives the follower arm is the transfer of tape from reel to reel. But as tape is transferred, the space between the two reels varies. This space variation is approximately 0.3 inches, and the spade is narrowest at the 50% full reel point. To accommodate this variation, the follower arm is designed to essentially follow the transferring tape reel dimensions with little or no gap at either end of a play or rewind cycle. This results in a transfer of the point of contact on the reels as the angle of the follower changes.

Nubs of low friction material are provided on the end (both sides) at one extreme of the moving point of contact, and nearer to the pivot point (both sides) at the other extreme of the moving point of contact. These nubs are identified by reference numerals 37, 38, 39 and 40. When only nub 37 is in contact with a near empty reel on one side, nub 39 is near contact with the full reel on the other side, and when only nub 38 is in contact with the other near empty reel, nub 40 is near contact with the other reel.

Figure 7A:
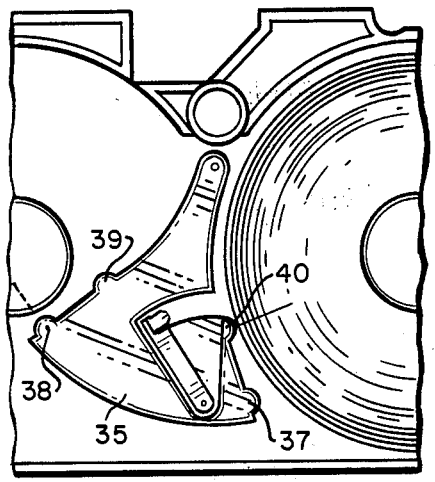
FIGS. 7A through H illustrate the operation of two different follower arms with hysteresis.
Figure 7B:
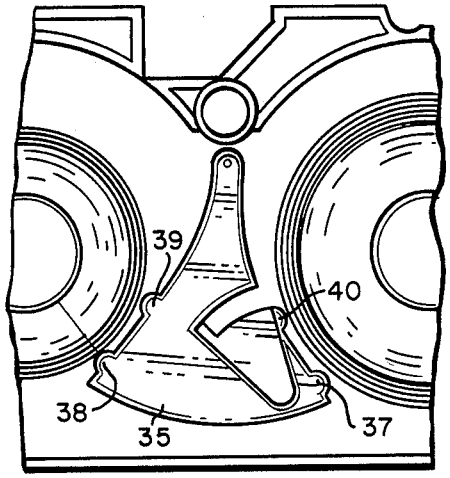
Figure 7C:
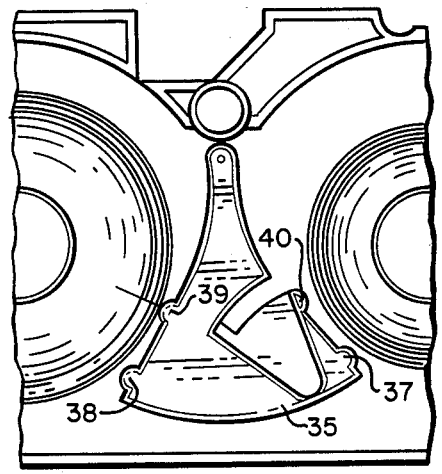
Figure 7D:
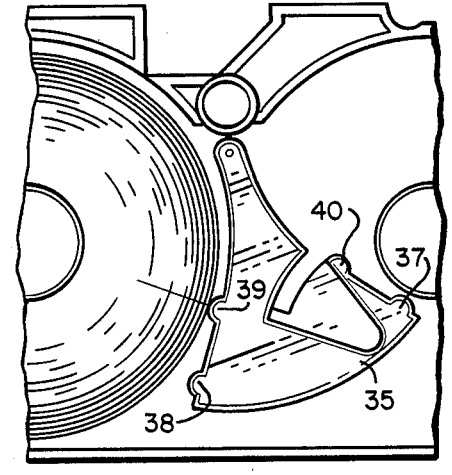

FIGS. 7A through 7D illustrate the operation of the follower arm with four contact points at nubs 37, 38, 39, and 40 in a rewind sequence, starting in FIG. 7A with the takeup reel full, and the supply reel empty. Note the small gap at nub 38 with the hub of the supply reel, and the fact that the takeup reel has contact at only one point (nut 40). In FIG. 7B, the supply reel has filled sufficiently to make contact at one point (nub 38) of the follower arm, while the emptying takeup reel has lost contact. In FIG. 7C, the supply reel has filled sufficiently to transfer contact to a point (nut 39) at a shorter radius from the pivot of the follower arm. FIG. 7D illustrates the position of the follower arm after complete rewind. The process is reversed when transferring tape from the supply reel to the takeup reel. The interesting thing to note is that when the direction of tape is reversed, and tape is supplied from one reel to the other, the follower arm will not move until the receiving reel has received sufficient tape to make contact with one or two nubs on the follower arm. This hysteresis in the motion of the follower arm when reversing tape direction allows some segment of tape to be replayed without penalty.

Figure 7E:
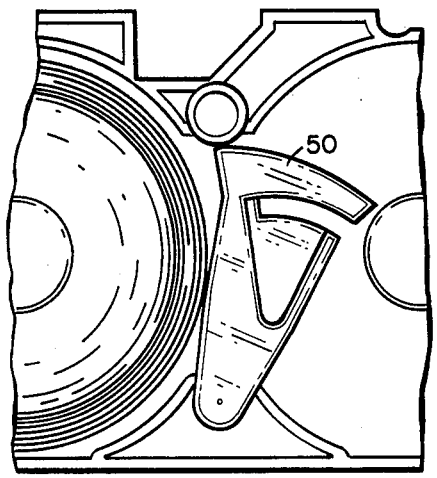

The hysteresis just referred to is more important in the second embodiment. In that embodiment shown in FIG. 3, the follower arm is designed with straight contact segments so that as tape is transferred, there are contact points along straight segments of the follower arm, as shown in FIGS. 7E through 7H, with tape now being transferred from the supply reel to the takeup reel. Note the tap at the takeup reel which provides a segment of tape to be transferred before the arm is contacted to pivot the arm counterclockwise, as shown in FIG. 7E. Contact on the takeup reel begins out on the end of the follower arm and moves along a straight segment until well past the 40% full mark shown in FIG. 7F, and then transfers to the longer straight segment. FIG. 7G shows this segment in contact with a 60% full mark and then in FIG. 7H with a 100% full mark in contact. By proper design of this follower arm, the hysteresis can be made not only to permit replay of segments, but also for the replay segment to be of the same length anywhere in the tape.

Referring again to FIG. 2, the spring loaded magnet 36 is carried by an arm 41 pivoted on a pin 42. As shown, the magnet arm 41 is held back against the force of a wishbone spring 43 by the tip 34a of the latch pin 34. This pin is provided with a sleeve 34b that is press fitted into a groove in the underside of the follower arm 35, with the leg of the latch pin opposite the tip 34a protruding through a vertical slot 46 in the follower arm. When the last authorized play cycle has caused the finger 30a of the pawl 30 to drop into the flot 20a of the ratchet wheel 20, the pawl 30 pivots closkwise (as viewed in FIG. 2) causing the latch release paddle 30b to engage the end of the latch pin 34 protruding from the slot 46, and pull it toward the pivot of the follower arm 35, toward a post 44 extending between the two halves of the caseette. (Note that a spacer 45 holds the follower arm up off the bottom half 11 of the cassette sufficiently for the follower arm 35 to pivot between the flanges of the supply and takeup reels free of any contact with the bottom half of the cassette.) Since the last authorized play could occur anywhere in the tape, the angular position of the follower arm (and therefore the latch pin 34) relative to the pawl paddle 30b could be anywhere between extremes. It is for that reason that the pawl paddle has been made arcuate; to be sure it engages the latch pin for any possible angular position of the follower arm 35.

The follower arm 35 provides all of the power, and derives its power from the transferring tape. A slip clutch is therefore necessary to couple the follower arm 35 to the reciprocating lever 24. That clutch consists of a tab 47 secured to the Y-shaped lever 24 in the space 26 between the branches of the lever. The tap 47 extends downwardly from the lever 24, and carries a detent 48 which engages vertical grooves 49 on the end of the follower arm 35. As the follower arm moves in one direction, the detent slips over the end of the follower arm until it engages a groove 49, and then forces the lever 24 to rotate with the follower arm over an arcuate distance set by the space between the branches of the Y-shaped lever arm. Motion is transferred to the ratchet wheel 20 by the wire pawl 25 to advance the ratchet wheel, and thereby increase the count by one. Once the lever 24 has reached its limit of rotation (which is set to be just enough to advance the count by one), the pin 27 stops the lever, and the flexible tab 47 will allow the detent 48 to ride over grooves 49 on the end of the follower arm until the direction of tape motion is reversed.

It should be appreciated that, as tape is transferred to the empty takeup reel on the right from the full supply reel on the left, the follower arm 35 will not rotate at a uniform rate, although tape is fed from one to the other at a uniform linear rate. Consequently, it may be desirable to program the spacing between grooves 49 so that it increases from one side to the other, with the smaller spacing near the supply reel side. In that way the amount of rewind before engagement of the next groove may be programmed to allow the same length of replay along the entire length of the tape without advancing the count. Alternatively, the grooves may be programmed to permit replay without penalty only within defined segments of arbitrary length of recorded program. In addition, the spacing of the first groove from each side of the follower arm 35 allows for a segment of tape that may be replayed at the beginning and end of the tape an unlimited number of times without penalty to view previews and trailers.

Although an erasing magnet is preferred as a means of preventing plays after the authorized number, it would be feasible to link a pawl equivalent to the pawl 30 to a brake locking mechanism. The existing brakes in a cassette are spring biased in the "brake set" position. A pin in the tape deck pushes a paddle to release the brakes when the cassette is inserted. The brake locking mechanism for this invention would consist of a spring biased lever pawl biased to lock the existing brakes after the cassette is removed from the tape deck following the last authorized play, as will be described more fully hereinafter with reference to FIG. 6.

Again referring to FIG. 2, in order to prevent the ratchet wheel assembly from advancing during loading, testing and/or duplication, a plastic restraining tab 24c is molded as part of the reciprocating arm 24. This restraining tab passes through a notch 24e in the upper half 10 of the cassette and prevents reciprocating motion of the arm 24. Once duplication and testing has been completed, the restraining tab is removed from the outside of the sealed cassette, thereby activating the count wheel assembly. This restraining tab is made with a smaller diameter adjacent the reciprocating arm so that it will break there when it is removed.

Figure 3:
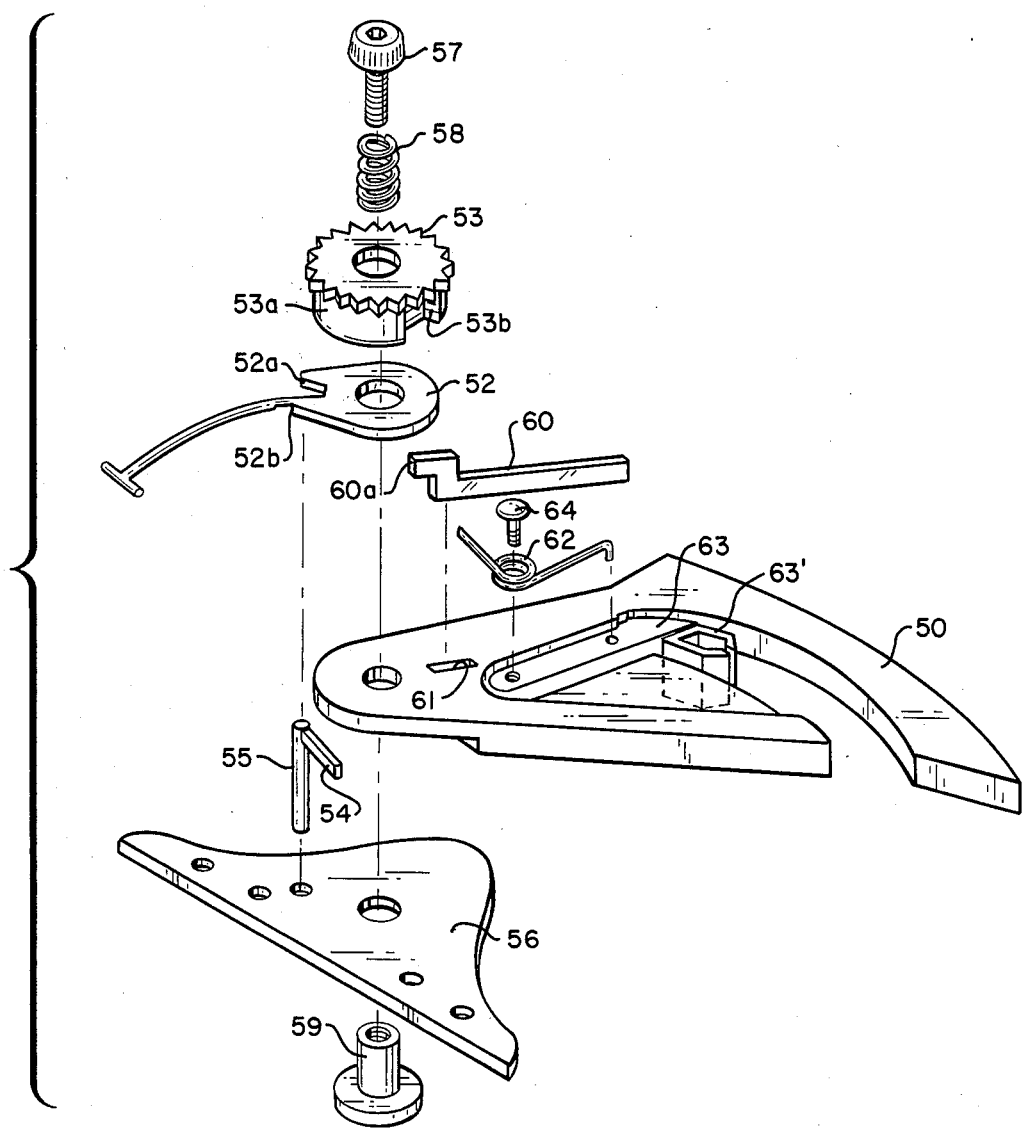
FIG. 3 is an exploded view of a second embodiment using a friction clutch for counting and limiting the number of times a conventional VHS video cassette may be played, and erasing the tape after the last count.

Still other variations will occur to those skilled in the art. An important variation to the embodiment of FIG. 2 is a friction clutch for coupling the follower arm to the reciprocating lever in place of a detent clutch. Its advantages are detection of a rewind started at any point in the tape, instead of at finite points with a detent clutch, and allowing a predetermined amount of replay before the start of another play cycle which will advance the play counter after a rewind is started. FIG. 3 illustrates in an exploded view the essential parts of a friction coupled system. Note that significantly fewer parts are needed to accomplish the same functions as the embodiment of FIG. 2, and that the parts may be preassembled as a unit to be added to a conventional cassette over the brake area 13.

Figure 7F:
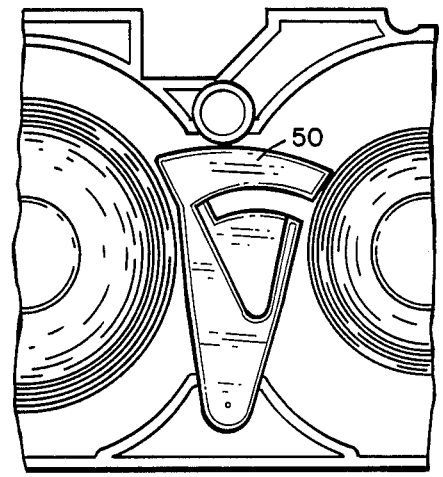
Figure 7G:
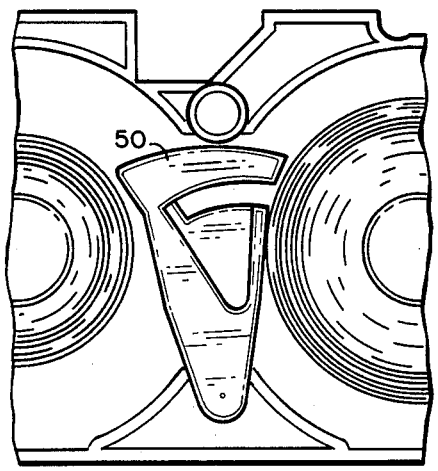
Figure 7H:
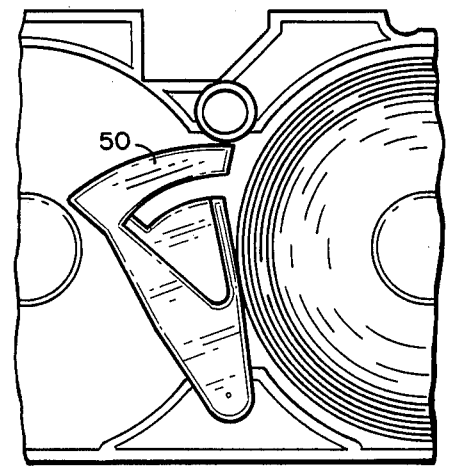

A follower arm 50 has a specific shape, with the ends away from a pivot pin 51 on both sides angled out slightly, as shown more clearly in FIGS. 7F through 7H. The shape is designed to vary the contact point as tape on the takeup reel builds up so that a proportional relationship between playing time and displacement angle of the follower arm is achieved. When the tape is rewound for the next play, the follower arm is not contacted by the supply reel for a predetermined time, and then as tape builds up on the supply reel, the arm is pivoted by the tape build up toward the takeup reel. Then when play is started, the arm is held in position by the friction clutch until tape builds up enough on the takeup reel to contact the arm. This gap between the arm and the tape when rewind is started, and again when play is started provides a hysteresis in the system that allows for limited rewind-play cycles to take place without advancing the play counter. In that way a limited segment may be replayed at any point in the tape without penalty.

Stability of the follower arm 50 during handling and storage is maintained by the friction coupling link comprised of a friction disc 52 between the follower arm 50 and a counting ratchet wheel 53. In the case of extreme shock to the cassette, where the friction may be overcome by inertia forces, the free swing range of the follower arm will be less than the displacement needed to cause a count to be activated.

The counting ratchet wheel 53 is comprised of a ratchet wheel with a count disc cemented onto it, or with numbers printed directly on it, and a ratchet pawl 54 on a pin 55. The pin 55 also serves to limit the rotation of the friction disc 52 to the space between two ears 52a and 52b. Note that the ratchet wheel is provided with a thick skirt 53a with an opening 53b. The bottom of the skirt bears against the friction disc 52, which in turn bears against the follower arm 50. A base plate 56 secured over the tape guide walls around the brake area 13 (FIG. 1) allows the follower arm 50 to pivot between the flanges of the supply and takeup reels free of any contact with the lower half of the cassette. A cap screw 57, a compression spring 58, and a nut 59 provide the compression necessary for the desired friction between the skirt 53a of the count wheel 53 and the friction disc 52, and between the follower arm 50 and the friction disc 52.

Carried by the follower arm 50 in a manner analogous to the embodiment of FIG. 2 is a magnet release pin 60, a tip 60a of which protrudes from a slot 61 in the follower arm 50. A wishbone spring 62 has the end of one branch connected to a magnet arm 63 and has the center pinned by a pivot pin 64. The end of the other branch bears against the back of the tip 60a of the pin 60. That tip 60a of the pin 60 in turn bears against the skirt of the count wheel 53. When the count wheel has advanced through a predetermined number of authorized plays, the opening 53b in the skirt will be positioned just next to the tip 60a of the pin 60. The next play of at least a segment more extensive than an authorized segment replay which is a function of the hysteresis of the follower arm 50, will then advance the count wheel, and the spring 62 will then force the tip 60a of the pin 60 into the opening 53b in the skirt 53a of the count wheel 53. This motion of the pin 60 releases the magnet arm 63, and the spring 62 pivots the magnet arm 63 to place an erase head 63' shown in FIG. 5 comprised of a permanent magnet and pole pieces with a narrow gap in contact with the tape on the takeup side.

FIG. 5 shows the essential details of the magnet, a permanent magnet 66 with north (N) and south (S) poles abutting pole pieces 67 and 68. These pole pieces are shaped to provide a gap 69 approximately 0.010 inches (0.25 mm). A plastic spacer may be used to maintain the gap. The small gap contains the magnetic flux within the immediate area. When the gap is brought near or against the tape, the flux will concentrate in a path through the magnetic material on the tape. In that manner, a high density flux in the tape is provided to erase the tape with no measurable field at a distance of about 0.10 inches (2.5 mm) or greater. By holding the gap of the pole pieces at a distance of more than 0.25 inches (6 mm) from the video tape until needed to erase, no unintentional damage can occur to the recorded video program.

A summary of the friction coupled embodiment of FIG. 3 will now be presented. The starting conditions are: supply reel full, takeup reel empty, and follower in contact with the tape of the supply reel. This is the configuration that will occur after a full rewind has been made.

(a) Play starts.
1. Build up under the follower arm 50 starts on the takeup side.
2. The tape unwinds from contact with the supply side of the follower arm at a short radius.
3. Friction holds the follower arm 50 in place at this time.
4. Tape will build on the takeup reel until contact near the tip of the follower arm 50 occurs. (The longer radius.)

(b) The build up now causes the follower arm to rotate.
1. The friction disc 52 couples the motion to the counting wheel 53.
2. Counting action starts, as the wheel moves.
3. When the next tooth passes under the pawl, the count advance has been completed.
4. The engagement force of the pawl 54 will prevent reverse rotation of the counter wheel 53.
5. The friction disc 52 has ears 52a and 52b to limit its rotation, thus preventing motion beyond that needed to register one count to be coupled to the count wheel 53.
6. No further rotation of the counting wheel 53 can occur after the forward stop engagement of friction disc 52.
7. The follower arm 50 now slips under the stopped friction disc 52 and the counter wheel 53 until the end of play occurs. Note that the count of the wheel 53 is always advanced on play.

(c) Rewind cycle starts.
1. As rewinding occurs, the follower arm 50 will remain in a fixed position until the build up on the supply reel engages it.
2. The friction disc 52 now rotates in a reverse direction.
3. Reverse rotation of the count wheel 53 is prevented by the pawl 54.
4. Rotation of the friction disc 52 is allowed until the reverse stop ear is engaged.
5. The follower arm 50 now slips under the friction disc 52 and count wheel 53. This condition is maintained for the remainder of the rewind mode.

Figure 4:
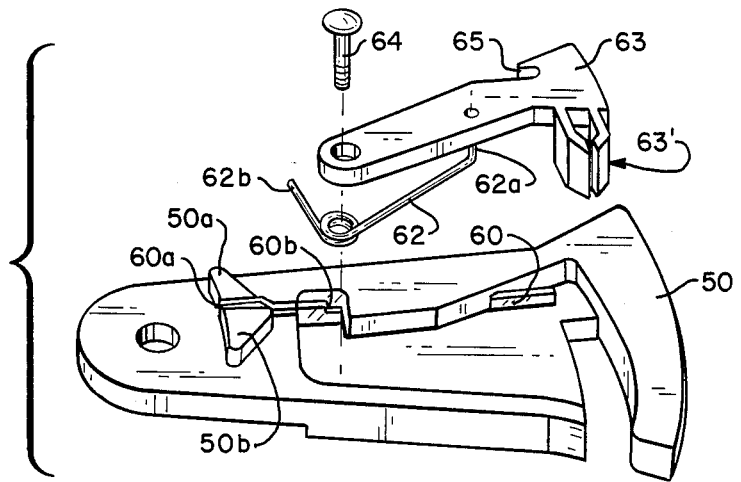
FIG. 4 illustrates a preferred design for the tape reel follower arm and a spring loaded magnet arm in the embodiment of FIG. 3.

A preferred embodiment of the follower arm 50 for the embodiment of FIG. 3 is shown in FIG. 4, where the same reference numerals are used for the corresponding components. The magnet arm carried a magnet 63' inside pole pieces as shown in FIG. 5. The wishbone spring 62 is sandwiched between the tape follower arm 50 and the magnet arm 63 with the screw 64. A notch 65 receives the pin 60 to hold the arm 63 back against the force of the spring 62. One end 62a engages the arm 63, and the other end 62b engages a notch 60b on the pin 60 which is carried by the arm 50. Blocks 50a and 50b on the follower arm provide a channel that helps guide the tip 60a of the pin 60 against the skirt 53a (FIG. 3) of the ratchet wheel counter 53.

As noted hereinbefore, an alternative to erasing the tape, after a predetermined number of authorized plays, is to lock the reel brakes when the cassette is removed from the tape deck. An example of how this may be accomplished will now be briefly described with reference to FIG. 6, and the FIGS. 6A through 6F.

Figure 6:
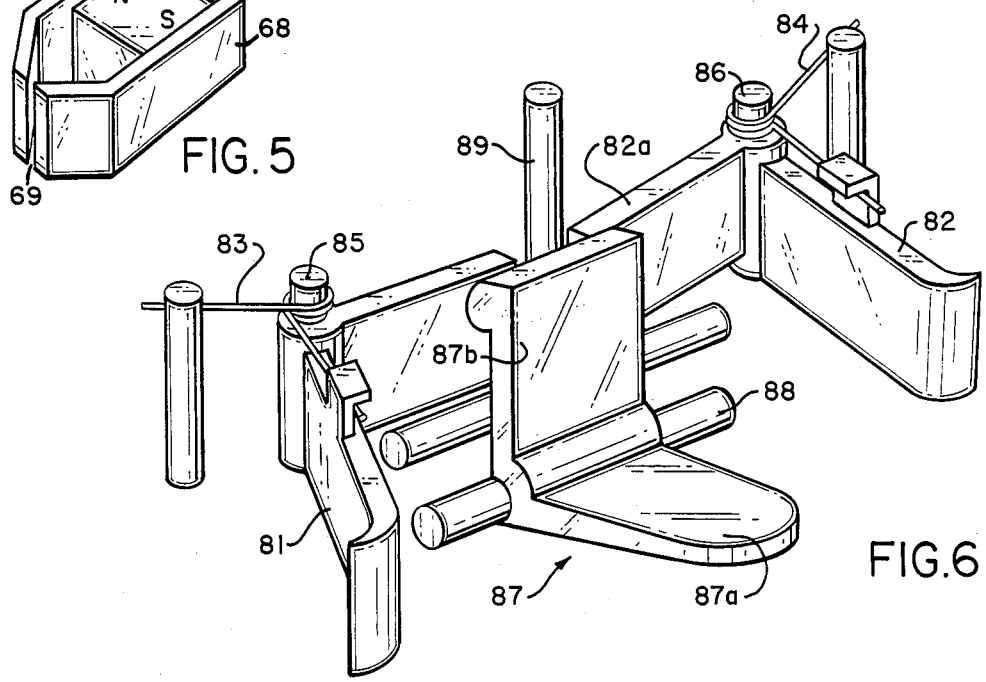
FIG. 6 illustrates the manner in which brakes for the cassette reels may be locked in the engaged position by a lever.
Figure 6A:
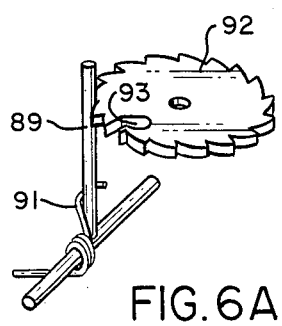
FIGS. 6A through 6F illustrate the manner in which the reel brake lock operates in response to a count wheel advancing to the count of the last authorized play.

Referring to FIG. 6, brake pawls 81 and 82 normally engage notches on the bottom flanges of the cassette reels shown in FIG. 1 when the cassette is removed from the tape deck. Springs 83 and 84 provide the force that pivots the brake pawls on posts 85 and 86 for engagement of the reel notches. These brake pawls are retracted against the force of the springs by an L-shaped lever 87 having a "paddle" portion 87a over a hole in the bottom half of the cassette, and an upright portion 87b. This lever pivots on a pin 88 held by the bottom half of the cassette.

The lock on these brake pawls is comprised of a pawl 89 pivoted on a in 90, also held by the bottom half of the cassette. A spring 91 shown in FIG. 6a biases the pawl 89 against the sprocket wheel 92 used to count the authorized plays.

Figure 6B:
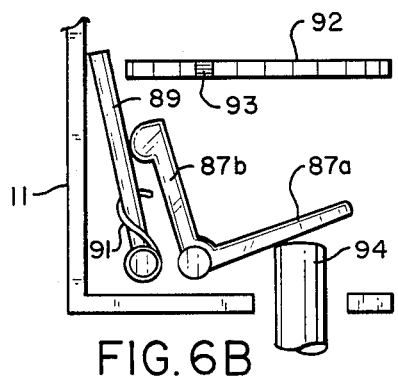
Figure 6C:
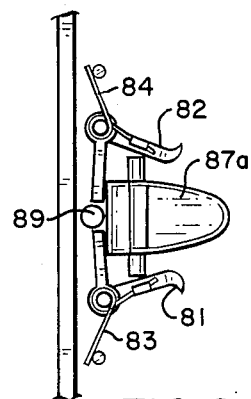

A partially spiral shaped slot 93 in the sprocket wheel allows the pawl 91 to move forward on the last authorized play, but at that time the brake pawls 81 and 82 are retracted by the lever 87 as shown in FIGS. 6B and 6C. FIG. 6B shows a pin 94 in the tape deck that pushes the paddle portion 87b back against levers 81a and 82a of the back pawls, and FIG. 6c shows the retracted position of brake pawls.

Figure 6D:
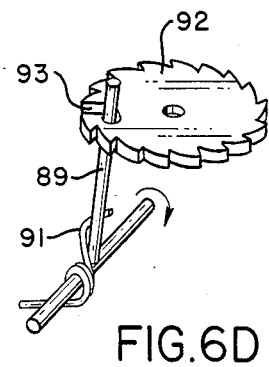
Figure 6E:
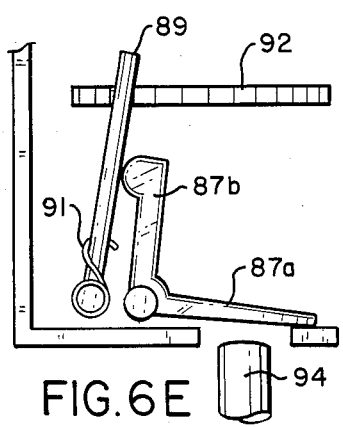
Figure 6F:
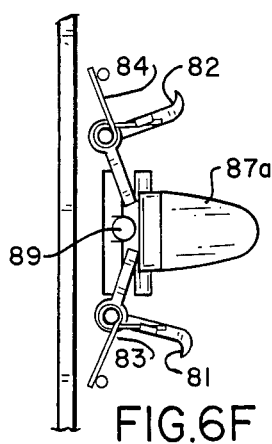

At this time, the tape may be rewound and replayed again, but with added drag on the reels, since the sprocket wheel 92 cannot turn as the follower arm is pivoted during rewind and replay. Unauthorized plays will not be prevented until the cassette is withdrawn from the tape deck. At that time, the pin 94, as shown in FIG. 6E, retracts to allow the brake pawls to pivot out, as shown in FIG. 6F, into engagement with notches in the reels. As the portion 87b of the brake lever 87 pivots forward, the pawl 89 also pivots forward under the force of the spring 91. As the pawl 89 moves forward further into the slot 93, it causes the sprocket wheel 92 to rotate through a small angle due to the partial spiral shape of the slot. That shape is designed to provide an edge behind the pawl 92 when it has traveled into the slot 93 to the furthest point possible against its curved side of the slot, as shown in FIG. 6D.

If an attempt is made to reinsert the cassette in a tape deck after the brakes have been locked, the pin 94 will not be able to pivot the portion 87b of the brake lever 87 to release the brakes because of the pawl 89 in its forward position shown in FIG. 6E, and the back side of the partially spiral shaped slot 93 bearing against the back of the pawl 89. To try to force the cassette into the tape deck would only result in the portion 87a being bent up. To assure that, the pawl 89 is made of rigid material strong enough not to break, such as steel, while the brake lever 94 is made of relatively flexible material that is rigid enough to allow it to pivot for the normal brake setting purpose, yet flexible enough to bend and not break when the pawl 39 is in the locking position shown in FIG. 6E.

The locked reel will not only prevent further unauthorized replay of the tape, but also prevent removal of the tape from the cassette without opening the cassette. To prevent that, the two halves of the cassette are preferably welded together wherever there is contact, such as by sonic welding techniques. To prevent breaking or cutting the cassette open, the cassette may be leased, not sold, for the purpose of renting it out with a condition of the lease that the cassette not be opened.

What is claimed is:
1. In a reel-to-reel tape cassette comprised of a bottom half and a top half and two reels between the halves with tape having its ends secured to said reels, one separate end to each reel for transfer from one reel to the other during play and back during rewind, each reel having flanges greater in diameter than a full roll of said tape, apparatus for counting and limiting the number of rewind-play cycles, wherein each cycle counted consists of any play or replay following a rewind of more than a predetermined segment, said apparatus comprising

- a follower arm pivoted on a pin between said reels and offset from a line connecting the axes of said reels, said follower arm being spaced from and movable between flanges of one reel to between flanges of the other of said reels as tape is transferred between said reels,
- a count wheel assembly comprising a ratchet wheel and pawl for preventing backward motion of said ratchet wheel,
- a clutch for coupling reciprocating motion of said follower arm to said count wheel assembly, said clutch including means for limiting rotation of said ratchet wheel to an arc just encompassing a count of one ratchet tooth of said ratchet wheel for each play before engagement by said pawl on the next ratchet tooth,
- a notch in said ratchet wheel of said count wheel assembly,
- means spring biased to engage said notch in said count wheel assembly, and
- means responsive to said spring biased means engaging said notch for preventing further play after said number of rewind-play cycles.

2. Apparatus as defined in claim 1 wherein the end of said follower arm opposite its pivot is arcuate, with detent notches on the arcuate end, and said clutch means is comprised of

- a Y-shaped reciprocating lever pivoted on the axis of said count wheel with arms extending radially,
- a stop pin secured to said cassette in a position between said arms of said reciprocating lever, and
- a tab having a detent extending from said reciprocating lever to a position for engagement of said notches on said arcuate end of said follower arm by said detent.

3. Apparatus as defined in claim 2 wherein said means for preventing further plays is comprised of

- a pin latching said spring biased means for preventing further plays in a position rendering said spring biased means inoperative for preventing further play,
- an elongated finger on the end of said spring biased means for engaging said notch and thereby preventing further motion of said ratchet wheel, and
- a paddle secured to said spring biased means for preventing further motion of said ratchet wheel, said paddle being secured in a position to engage said latching pin and, in response to motion of said elongated finger moving into said notch, retracting said latching pin to release said spring biased means to prevent further play-rewind cycles.

4. Apparatus as defined in claim 3 wherein said spring biased means for preventing further play is comprised of a spring biased arm carried on said follower arm and a magnet on the end of said spring biased arm, said magnet being secured between pole pieces forming a gap of an erase head, said spring biased arm being locked in a retracted position against the force of said spring by said latching pin, and means in said follower arm for guiding said spring biased arm, when released by retraction of said pin, to move in a path which places said gap against said tape for erasing.

5. Apparatus as defined in claim 1 wherein said clutch means is comprised of a friction disc on a common shaft for rotation with said follower arm, and a screw and compression spring assembly for adjusting friction between said disc and both said count wheel and said follower arm, said friction disc having protruding ears and said clutch means having a stop pin secured to one half of said cassette in a position between said ears, said ears being spaced apart on said friction disc, a set distance for limiting rotation of said count wheel through just one count in response to each play.

6. Apparatus as defined in claim 5 wherein said count wheel assembly comprised of a ratchet wheel and pawl for preventing backward motion of said ratchet wheel includes a skirt extending from said ratchet wheel for engagement with said friction disc, a slot in said skirt in a position of a count corresponding to the limited number of plays,

- said means for preventing further play is comprised of a latching pin that is spring biased against said skirt, and
- means responsive to said latching pin entering said slot on said skirt for releasing said means for preventing further play.

7. Apparatus as defined in claim 6 wherein said means for preventing further play is comprised of a spring biased magnet arm on said follower arm with a magnet on the end thereof between pole pieces forming a gap of an erase head, said magnet arm being locked in a retracted position against the force of said spring by said latching pin, and means for guiding said arm, when released by retracting said pin, in a path to place said gap against said tape for erasing.

8. Apparatus as defined in claim 1 wherein said means for preventing further play is comprised of spring biased brake means for preventing said reels from rotating while said cassette is not in a tape deck, a lever for releasing said brake means when said cassette is inserted into a tape deck, a spring biased lever pawl positioned behind said brake release lever and positioned away from said count wheel while in a brake releasing position, said count wheel having a notch, and said lever pawl being spring biased to engage said notch in said count wheel assembly when said cassette is removed from a tape deck after the last authorized play, said notch having a partial spiral shape at the end of said notch extending into said count wheel to allow arced motion of said lever pawl when said cassette is removed from said tape deck, whereby said lever pawl prevents further rotation of said count wheel assembly after the last authorized play, and when said cassette is removed from said tape deck said partial spiral shape at the end of said notch will cause said count wheel to rotate sufficiently to capture said lever pawl in a position against said brake release lever, thereby locking said reel brakes.

9. Apparatus as defined in claim 1 including break-away means protruding from said cassette connected to said clutch for disabling said clutch from coupling reciprocating motion to said count wheel assembly until broken away, said break-away means being designed to break at a point juxtaposed to said clutch, whereby loading, duplication and testing said cassette may be carried out before said count wheel assembly is activated upon breaking away said break-away means.

* * * * *